April 2, 1946.   H. MENDELSON   2,397,749
CLAMP
Filed June 17, 1944
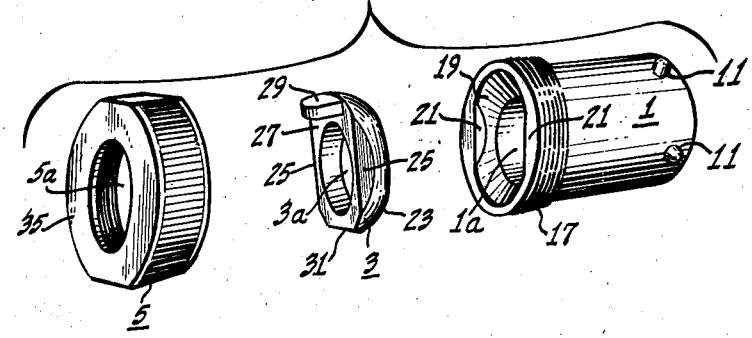
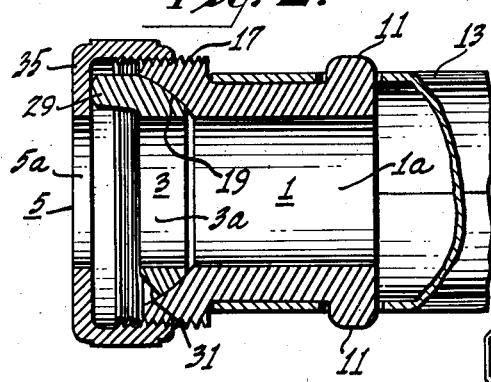
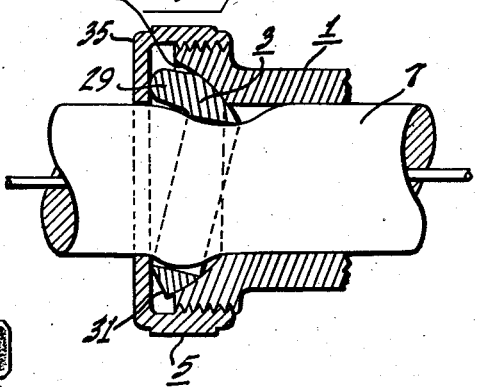
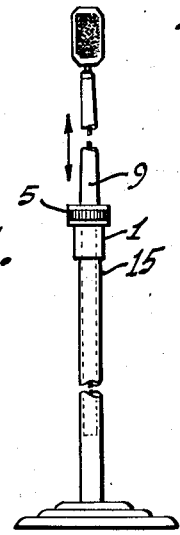
Inventor
HANS MENDELSON
Attorney Patented Apr. 2, 1946

2,397,749

UNITED STATES PATENT OFFICE 2,397,749

CLAMP

Hans Mendelson, Bloomington, Ind., assignor to Radio Corporation of America, a corporation of Delaware Application June 17, 1944, Serial No. 540,870

5 Claims. (Cl. 248—161)

This invention relates to clamps and has for its principal object is to provide a compact and reliable manually adjustable clamp suitable for cables, microphone stands and other flexible or inflexible cylindrical elements, and one having no protruding parts capable of pinching or otherwise injuring the operator's fingers or clothing.

Other objects and advantages will be apparent and the invention itself will be best understood by reference to the following specification and to the accompanying drawing wherein:

Figure 1 is an exploded view of a clamp constructed in accordance with the principle of the invention, Figure 2 is a longitudinal sectional view of the clamp of Fig. 1 showing the parts assembled in position to receive the element to be clamped, Figure 3 is a longitudinal sectional view of the clamp of Figs. 2 and 3 showing the clamping force applied to a flexible cable, and Figure 4 shows a microphone stand incorporating a clamp of the invention.

As shown in Fig. 1, the device of the present invention comprises three separable parts, including a sleeve 1, a clamping element or cam 3, and a nut or cap 5. Each of these parts is provided with a bore or aperture 1a, 3a, 5a, respectively, through which the cable 7 (Fig. 3) or other cylindrical element 9 (Fig. 4) to be clamped, extends.

The sleeve 1 may form an integral part of a fixture, such, for example, as an outlet box or plug 13 (Fig. 2), or the stationary portion of a microphone stand 15 (Fig. 4), or it may be secured to such a fixture, as by means of pins 11 (see Figs. 1 and 2). The outer surface of the sleeve 1 is threaded as indicated at 17 and the threaded end is provided with a dished recess or socket 19. This concavity 19 is shaped to receive the cam 3 and is preferably provided with a pair of oppositely located flats 21 on its perimeter to prevent the said cam from turning therein.

The cam 3 has a convex "bottom" surface 23 of a curvature to fit the concave surface of the socket 19, and two flat side surface portions 25 which are adapted to abut the flat parts 21 on the inner perimeter of the socket. Thus, the cam 3 may be tilted within and along a diameter of the socket 19 without twisting or turning therein. The ouer or "top" surface 27 of the cam 3 is flat and lies in the plane of the end of the sleeve 1 when, as shown in Fig. 2, the cam is in its idle or unlocked position within the socket 19. This flat surface 27 is provided with a protuberance 29 through which the above described tilting movement may be imparted to the cam 3 by the cap 5 when the said cap is screwed up on the threaded end 17 of the sleeve 1.

As shown more clearly in Figs. 2 and 3, that portion of the edge of the surface 27 which lies opposite to the protuberance 29 is cut away or beveled, as indicated at 31, to permit the cam to be tilted a greater distance than it ordinarily would when the cap 5 is screwed up on the sleeve 1.

The cap or nut 5 comprises an internally threaded shell which terminates in an annulus 35 through which the part (7 or 9) to be clamped, extends. As the cap is screwed onto the sleeve 1, the inner surface of the annulus 35 is brought into contact with the protuberance 29 on the cam 3 and, when this rotary movement is continued, causes the cam to tilt along the diagonal between its flat sides 25 and to apply a clamping force to the part which extends therethrough.

If the part to be clamped comprises a yieldable or compressible object such, for example, as the rubber covered cable 7 shown in Fig. 3, the clamping force may impart a small bend or kink thereto, thus increasing its resistance to both longitudinal and lateral displacement. This feature recommends the use of the clamp of the present invention as a "strain relief" or anchor for use in connection with outlet boxes, plugs and similar electrical terminals or units. Furthermore, the very slight degree of rotary movement in the cap 5 required to actuate the cam 3 recommends the clamp of the present invention for use in connection with any flexible or inflexible part or fixture wherein ease and rapidity of adjustment are prime desideratum.

What is claimed is:

1. A clamp comprising a sleeve adapted to receive a cylindrical object and provided at one end with a concave axial recess, a cam having a complementary convex surface mounted for tiltable movement within said concave recess, the opposite face of said cam being flat and terminating in the plane of said end of said sleeve when said cam is in its untilted position, said cam having an aperture therein through which said object is adapted to extend, and means supported on said sleeve and extending beyond said plane for applying an actuating force to said cam.

2. A clamp comprising a sleeve having a circular bore and a non-circular concave socket at an end thereof through which the object to be clamped is adapted to extend, a complementary convex cam mounted for tiltable movement in said socket along a diagonal of said sleeve, said cam having a circular aperture therein about said object, and means for tilting said cam in said recess along said diagonal whereby to apply a clamping force to said object.

3. A clamp comprising a threaded sleeve, a complementary threaded cap for said sleeve and a cam mounted for tiltable movement within and along a diagonal of said sleeve, each of said parts having a bore within which the object to be clamped is received, and means responsive to rotary movement of said threaded cap on said threaded sleeve for tilting said cam along said diagonal into clamping engagement with said object.

4. A clamp comprising a sleeve having a threaded outer surface and adapted to receive a cylindrical object within its bore, said sleeve having a concave axial recess in an end thereof, a cam having a complementary convex surface mounted for tiltable movement within said concave recess along a diagonal of said sleeve, said cam having an aperture therein through which said object is adapted to extend, a protuberance on the opposite face of said cam through which a tilting force can be applied to said cam, and a threaded cap adapted to be screwed up on said threaded sleeve in engagement with said protuberance for applying a tilting force to said cam.

5. A clamp for securing a cylindrical element in an adjustably fixed position with respect to another element, said clamp comprising a sleeve adapted to be secured to said other element and to receive said cylindrical part, said sleeve having a threaded outer surface and a dished axial recess on one end thereof, a cam having an aperture therein through which said object is adapted to extend and a convex face adapted to be received within said recess, a protuberance on the opposite face of said cam, and a threaded cap adapted to be screwed up on said threaded sleeve into engagement with said protuberance whereby said cam is caused to tilt within said recess and thereby exert a clamping force upon said cylindrical part.

HANS MENDELSON.